US009696178B2

(12) United States Patent
Maeda et al.

(10) Patent No.: US 9,696,178 B2
(45) Date of Patent: Jul. 4, 2017

(54) ROTATING ELECTRICAL MACHINE

(75) Inventors: Naohide Maeda, Chiyoda-ku (JP);
Masahiko Fujita, Chiyoda-ku (JP)

(73) Assignee: Mitsubishi Electric Corporation,
Chiyoda-ku, Tokyo (JP)

( * ) Notice: Subject to any disclaimer, the term of this patent is extended or adjusted under 35 U.S.C. 154(b) by 1102 days.

(21) Appl. No.: 13/877,615

(22) PCT Filed: Dec. 10, 2010

(86) PCT No.: PCT/JP2010/072230
§ 371 (c)(1),
(2), (4) Date: Apr. 3, 2013

(87) PCT Pub. No.: WO2012/077227
PCT Pub. Date: Jun. 14, 2012

(65) Prior Publication Data
US 2013/0197821 A1 Aug. 1, 2013

(51) Int. Cl.
*G01B 3/44* (2006.01)
*G01B 3/52* (2006.01)
(Continued)

(52) U.S. Cl.
CPC ............... *G01D 3/08* (2013.01); *H02K 11/20* (2016.01); *H02K 11/21* (2016.01); *H02K 11/25* (2016.01);
(Continued)

(58) Field of Classification Search
USPC .................................... 702/34, 35, 182, 183
See application file for complete search history.

(56) References Cited

U.S. PATENT DOCUMENTS

| 3,648,088 A * | 3/1972 | Wilkin | H02K 31/02 310/178 |
| 4,277,708 A * | 7/1981 | McNab | H01R 39/46 310/228 |

(Continued)

FOREIGN PATENT DOCUMENTS

| CN | 1395343 A | 2/2003 |
| JP | 50-10408 A | 2/1975 |

(Continued)

OTHER PUBLICATIONS

Communication dated Jan. 14, 2015 from the State Intellectual Property's Office of the People's Republic of China in counterpart Application No. 201080070385.9.

*Primary Examiner* — Mohamed Charioui
*Assistant Examiner* — Leonard S Liang
(74) *Attorney, Agent, or Firm* — Sughrue Mion, PLLC; Richard C. Turner

(57) ABSTRACT

Provided is a rotating electrical machine, including: temperature information acquisition means for acquiring information on a temperature of a brush; rotation information acquisition means for acquiring information on a rotation angle of a rotation shaft; and a wear amount calculation section for acquiring the temperature of the brush based on temperature information including output information of the temperature information acquisition means, and for calculating a total wear amount of the brush by integrating a product of a value corresponding to the temperature of the brush, the value being a wear amount function defined as a wear amount per unit sliding distance of the brush with the temperature of the brush used as a variable, and a value including an rotational speed of a rotor, with respect to time from immediately after start of use of the brush to a current time.

12 Claims, 7 Drawing Sheets

(51) Int. Cl.
  *G01D 3/08*   (2006.01)
  *H02K 13/00*  (2006.01)
  *H02K 11/20*  (2016.01)
  *H02K 11/21*  (2016.01)
  *H02K 11/25*  (2016.01)
  *H01R 39/58*  (2006.01)
  *H02K 11/04*  (2016.01)

(52) U.S. Cl.
  CPC ............ *H02K 13/00* (2013.01); *H01R 39/58* (2013.01); *H02K 11/048* (2013.01)

(56) References Cited

U.S. PATENT DOCUMENTS

| | | | | |
|---|---|---|---|---|
| 4,587,723 | A * | 5/1986 | Scuro | H01R 43/12 228/233.2 |
| 4,816,709 | A * | 3/1989 | Weldon | H02K 7/025 310/178 |
| 5,519,275 | A * | 5/1996 | Scott | F02B 63/04 310/112 |
| 5,791,426 | A * | 8/1998 | Yamada | B60K 6/26 180/65.24 |
| 5,825,114 | A * | 10/1998 | Mukai | H01R 39/20 310/242 |
| 5,873,801 | A * | 2/1999 | Taga | B60K 6/26 477/13 |
| 5,876,862 | A | 3/1999 | Shibuya et al. | |
| 5,952,762 | A * | 9/1999 | Larsen | B60R 16/027 310/232 |
| 6,034,531 | A * | 3/2000 | Senglat | G01R 31/3275 324/699 |
| 6,323,570 | B1 * | 11/2001 | Nishimura | A47L 5/28 15/392 |
| 6,633,104 | B1 * | 10/2003 | Hershey | H02K 15/00 310/228 |
| 8,138,652 | B2 * | 3/2012 | Davis | H02K 11/048 310/114 |
| 2003/0011388 | A1 | 1/2003 | Klaar | |
| 2004/0256922 | A1 * | 12/2004 | Steinmeyer | H02K 55/04 310/52 |
| 2005/0104460 | A1 * | 5/2005 | Kusase | F04D 29/582 310/63 |
| 2005/0122227 | A1 | 6/2005 | Itou et al. | |
| 2006/0125240 | A1 * | 6/2006 | Kato | F02N 11/04 290/31 |
| 2008/0150376 | A1 * | 6/2008 | Isoda | H02K 11/0047 310/52 |
| 2010/0283336 | A1 * | 11/2010 | Vasilesco | H02K 9/04 310/62 |
| 2011/0018380 | A1 * | 1/2011 | Yoshida | H02K 5/148 310/154.21 |
| 2011/0253085 | A1 * | 10/2011 | Kokubo | F01L 1/352 123/90.17 |
| 2012/0200184 | A1 * | 8/2012 | Takeuchi | H02K 16/00 310/112 |
| 2012/0248929 | A1 * | 10/2012 | Fish | H01R 39/58 310/248 |
| 2013/0218514 | A1 * | 8/2013 | Schieke | H01R 39/58 702/138 |
| 2014/0125206 | A1 * | 5/2014 | Fish | H02K 11/20 310/68 B |

FOREIGN PATENT DOCUMENTS

| | | |
|---|---|---|
| JP | 57-51075 U | 3/1982 |
| JP | 62-155744 A | 7/1987 |
| JP | 6-36370 U | 5/1994 |
| JP | 6-141513 A | 5/1994 |
| JP | 8-291349 A1 | 11/1996 |
| JP | 2003-102150 A | 4/2003 |
| JP | 2004-015989 A | 1/2004 |
| JP | 2005-168214 A | 6/2005 |

\* cited by examiner

ROTATING ELECTRICAL MACHINE

CROSS REFERENCE TO RELATED APPLICATIONS

This application is a National Stage of International Application No. PCT/JP2010/072230, filed on Dec. 10, 2010, the contents of all of which are incorporated herein by reference in their entirety.

TECHNICAL FIELD

The present invention relates to a rotating electrical machine such as a generator-motor to be mounted in, for example, an automobile or the like.

BACKGROUND ART

For example, a rotating electrical machine such as a generator includes a stator having an armature winding, a rotor having a field winding, and a brush. The brush is provided in pressure contact to a slip ring in a slidable manner, the slip ring being provided to the end of the field winding. The brush supplies an excitation current from a battery to the field winding.

When the brush has worn to interrupt energization between the brush and the slip ring, electric power supply from the battery to the field winding is stopped, and the rotating electrical machine fails to operate. In this case, the replacement of the brush is essential for restarting the rotating electrical machine.

If the rotating electrical machine fails to operate when a device mounting the rotating electrical machine is in operation, the device itself may break down. Particularly in the case where the rotating electrical machine is mounted in a vehicle, if the brush has worn to stop the operation of the rotating electrical machine, the vehicle may be seriously damaged.

Accordingly, in order to prevent an abnormal operation stop of the rotating electrical machine due to the wear of the brush, the life of the brush derived in consideration of a brush wear amount corresponding to an expected operating time of the rotating electrical machine is set to be sufficiently longer than a guaranteed performance period of the rotating electrical machine.

In order to lengthen the life of the brush, however, it is necessary to increase the length of the brush. The increased length of the brush results in increased size of the rotating electrical machine and increased cost.

In view of the above-mentioned problem, there have been proposed various types of rotating electrical machines including a device for warning of the arrival of replacement timing of the brush by estimating a wear amount of the brush.

A conventional brush wear detector for a vehicle generator includes a current detection circuit for detecting a current value flowing to the field winding of the generator via the brush of the generator, an output voltage detection circuit for detecting an output voltage value of the generator, and a brush wear determination circuit for determining a wear state of the brush based on the current value detected by the current detection circuit or the output voltage value detected by the output voltage detection circuit (see, for example, Patent Literature 1).

The brush includes a pair of a brush (+) and a brush (−). Each of the pair of brushes is urged and pressed against a slip ring by a coil spring.

The conventional brush wear detector for a vehicle generator detects an initial excitation current that flows through the field winding at the start of rotation of an engine, and determines the wear state of the brush based on the initial excitation current.

The conventional brush wear detector for a vehicle generator can warn that the brush has reached a wear limit based on the result of determination of the brush wear determination circuit. Thus, the brush can be replaced before energization between the brush and the slip ring is interrupted, to thereby avoid an abnormal operation stop of the conventional vehicle generator due to the wear of the brush.

A conventional brush monitoring device for a rotating electrical machine includes current-corresponding wear amount calculation means for obtaining a brush wear amount corresponding to an armature current detection value or a physical detection value correlated to an armature current based on current-wear amount characteristics, and rotational speed-corresponding wear amount calculation means for obtaining a brush wear amount corresponding to an armature rotational speed detection value or a physical detection amount correlated to an armature rotational speed based on rotational speed-wear amount characteristics. A warning is issued when a cumulative wear amount obtained by cumulatively adding the brush wear amounts calculated by those calculation means has exceeded a wear limit (see, for example, Patent Literature 2).

In the conventional brush monitoring device for a rotating electrical machine, a warning is issued when the cumulative wear amount has exceeded a wear limit. Thus, the brush can be replaced before energization between the brush and the slip ring is interrupted, to thereby avoid an abnormal operation stop of the conventional rotating electrical machine due to the wear of the brush.

A conventional brush wear management device for a servo motor includes an activation count counter for counting an activation count of a servomotor equipped with a brush, and an operating time counter for counting operating time of the servo motor equipped with a brush. The wear amount of the brush is calculated in consideration of not only one of the activation count counter and the operating time counter but also the other, and a warning is issued when it is determined that the brush has reached the end of the life based on the calculated wear amount of the brush (for example, Patent Literature 3).

In the conventional brush wear management device for a servo motor, a warning is issued when it is determined that the brush has reached the end of the life. Thus, the brush can be replaced before energization between the brush and the slip ring is interrupted, to thereby avoid an abnormal operation stop of the conventional servo motor due to the wear of the brush.

CITATION LIST

Patent Literature

[PTL 1] JP 2005-168214 A
[PTL 2] JP 6-141513 A
[PTL 3] JP 62-155744 A

SUMMARY OF INVENTION

Technical Problem

It is well-known that the progress of the wear of the brush differs depending on the temperature of the brush, and mainly as the temperature of the brush increases, the brush is liable to wear because of friction between the slip ring and the brush.

The conventional brush monitoring device for a rotating electrical machine described in Patent Literature 1 determines the wear state of the brush based on the current value detected by the current detection circuit or the output voltage value detected by the output voltage detection circuit. Thus, the fluctuation in progress of the wear of the brush caused by the fluctuation in temperature of the brush cannot be reflected in the calculation of the wear amount of the brush, and an accurate wear amount of the brush cannot be obtained. Further, the wear amount of the brush is determined for every start of the engine, and hence the wear amount of the brush cannot be determined during the operation of the engine after the start of the engine. Thus, a warning cannot be issued even when the brush has reached a wear limit during the operation of the engine. In the case where the conventional rotating electrical machine continues a continuous long-time operation, the rotating electrical machine may stop its operation due to a malfunction of the brush.

In the conventional brush monitoring device for a rotating electrical machine described in Patent Literature 2, the brush wear amount corresponding to the armature current and the brush wear amount corresponding to the armature rotational speed are independently obtained and added together.

As described above, the progress of the wear of the brush differs depending on the temperature of the brush. In other words, the wear amount per unit sliding distance of the brush with respect to the slip ring is a function of the temperature of the brush. Then, a value obtained by integrating the product of the wear amount per unit sliding distance of the brush corresponding to the temperature of the brush and the sliding distance of the brush with respect to the slip ring is a total wear amount of the brush.

In this case, a temperature change of the brush corresponding to the armature rotational speed and a temperature change of the brush corresponding to the armature current have a correlation.

Accordingly, in the conventional brush monitoring device for a rotating electrical machine, which calculates the total wear amount of the brush by independently obtaining the brush wear amount corresponding to the armature current and the brush wear amount corresponding to the armature rotational speed and adding together, a variation in wear amount of the brush caused by the temperature change of the brush is not accurately reflected, and the wear amount of the brush cannot be accurately obtained.

In the conventional brush wear management device for a servo motor described in Patent Literature 3, the wear amount of the brush is obtained based on the activation count and the operating time of the conventional servo motor.

For example, the conventional servo motor performs positioning control and linear or arc interpolation on a work table or the like. When the conventional servo motor is placed under a stable temperature condition, the wear amount of the brush can be roughly accurately obtained. However, when the conventional servo motor is placed under an unstable temperature condition, the fluctuation in progress rate of the wear of the brush caused by the temperature change of the brush cannot be reflected in the calculation of the wear amount of the brush, and an accurate wear amount of the brush cannot be obtained.

The present invention has been made in order to solve the above-mentioned problems, and has an object of obtaining a rotating electrical machine which is capable of calculating a wear amount of a brush irrespective of the presence/absence of operation of an internal combustion engine that transmits torque between a rotation shaft and the internal combustion engine, and is capable of precisely calculating the wear amount of the brush by accurately reflecting a temperature change of the brush.

Solution to Problems

According to the present invention, there is provided a rotating electrical machine, including: a housing; a rotor including a field winding, the rotor being coaxially fixed to a rotation shaft which is supported by the housing in a rotatable manner; a stator including an armature winding, the stator being fixed to the housing so as to surround the rotor; a slip ring fixed to the rotation shaft 7; a brush disposed at a position in contact with the slip ring; urging means for urging the brush against the slip ring; temperature information acquisition means for acquiring information on a temperature of the brush; rotation information acquisition means for acquiring information on a rotation angle of the rotation shaft; and a wear amount calculation section for acquiring the temperature of the brush based on temperature information including output information of the temperature information acquisition means, and for calculating a total wear amount of the brush based on a value obtained by integrating a product of a value determined in accordance with the temperature of the brush, the value being a wear amount function defined as a wear amount per unit sliding distance of the brush with the temperature of the brush used as a variable, and an rotational speed of the rotor, with respect to time from immediately after start of use of the brush to a current time.

Advantageous Effects of Invention

According to the rotating electrical machine of the present invention, the wear amount calculation section acquires the temperature of the brush based on the temperature information including the output information of the temperature information acquisition means, and the total wear amount of the brush is calculated based on the value obtained by integrating the product of the value of the wear amount function corresponding to the temperature of the brush and the rotational speed of the rotor with respect to the time from immediately after the start of use of the brush to the current time. Thus, the wear of the brush can be calculated in real time irrespective of the operation of the system of the rotating electrical machine, and further, the temperature change of the brush can be accurately reflected to accurately calculate the wear amount of the brush.

DESCRIPTION OF EMBODIMENTS

Figure 1:
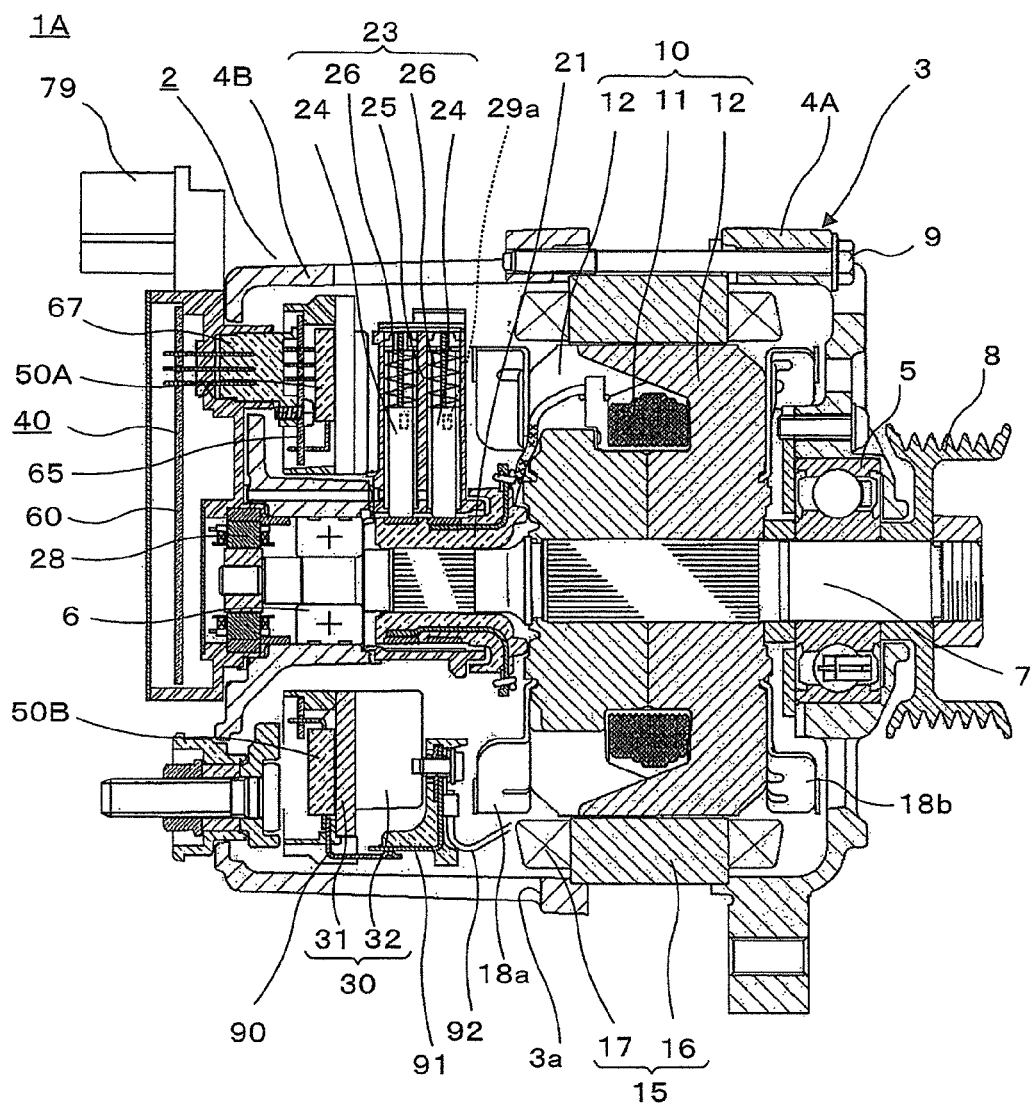
FIG. 1 A cross-sectional view of a generator-motor according to a first embodiment of the present invention.

Referring to the drawings, exemplary embodiments of the present invention are described below.

First Embodiment

Figure 2:
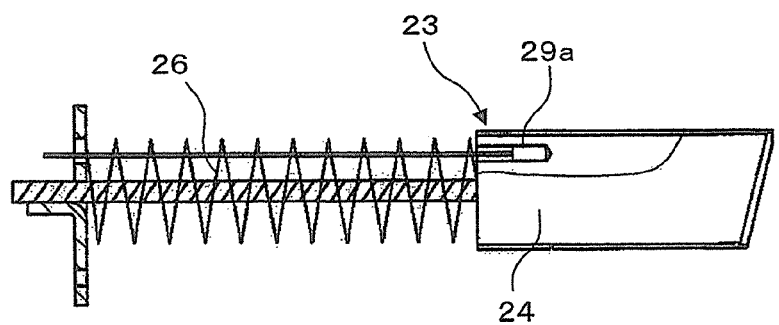
FIG. 2 A cutaway cross-sectional view of main parts of a brush and a thermometer included in the generator-motor according to the first embodiment of the present invention.

FIG. 1 is a cross-sectional view of a generator-motor according to a first embodiment of the present invention. FIG. 2 is a cutaway cross-sectional view of main parts of a brush and a thermometer included in the generator-motor according to the first embodiment of the present invention.

In FIG. 1, a generator-motor 1A as a rotating electrical machine includes a rotating electrical machine main body 2, and a control unit 40 integrally mounted to the rotating electrical machine main body 2.

The rotating electrical machine main body 2 includes a housing 3, a rotation shaft 7, a rotor 10, a stator 15, a rotation sensor 28, and a pulley 8. The housing 3 is formed of brackets 4A and 4B integrated by a bolt 9. The rotation shaft 7 is supported by bearings 5 and 6 which are supported to the housing 3, so that both ends of the rotation shaft 7 extend from the housing 3 and so as to be rotatable about the shaft. The rotor 10 is coaxially fixed to the rotation shaft 7 in the housing 3, and rotates together with the rotation shaft 7. The stator 15 is fixed to an inner peripheral surface of the housing 3 so as to surround the outer peripheral side of the rotor 10. The rotation sensor 28 is mounted on one end of the rotation shaft 7, and serves as rotation information acquisition means for acquiring information on a rotation angle of the rotation shaft 7 (rotor 10). The pulley 8 is fixed to the other end of the rotation shaft 7 and connected to an internal combustion engine, such as an engine, via a belt (not shown). The pulley 8 transmits torque of the rotation shaft 7 to the internal combustion engine, and transmits torque of the internal combustion engine to the rotation shaft 7.

As the rotation sensor 28, for example, a resolver can be used.

The rotating electrical machine main body 2 further includes fans 18a and 18b and a slip ring 21. The fans 18a and 18b are mounted on both side surfaces of the rotor 10 in the axis direction of the rotation shaft 7. The slip ring 21 is fixed to the rotation shaft 7 on one side of the rotor 10 in the axis direction of the rotation shaft 7, and supplies a current to the rotor 10. The rotating electrical machine main body 2 further includes a brush unit 23, a thermometer 29a as illustrated in FIG. 2, and a current detection element (not shown). The brush unit 23 includes a pair of brushes 24 arranged at positions in contact with the outer peripheral surface of the slip ring 21, and a pair of springs 26 serving as urging means for urging the pair of brushes 24 against the slip ring 21. The thermometer 29a is buried in the brush 24 to serve as temperature information acquisition means for acquiring information on the temperature of the brush 24. The current detection element serves as current information acquisition means for measuring a current flowing through the brush 24, namely a field current.

The control unit 40 includes three power circuit modules 50A, a field circuit module 50B, a heat sink 30, and a control board 60. The heat sink 30 has the power circuit modules 50A and the field circuit module 50B mounted thereon and is supported by the housing 3. The control board 60 includes a control section formed of a circuit control section and a wear amount calculation section to be described later.

Note that, the control section is formed of a CPU, a RAM, a ROM storing various kinds of control programs, and the like, and realizes the respective functions of the circuit control section and the wear amount calculation section.

Each power circuit module 50A includes a switching element (not shown) for turning ON/OFF a current supplied to the stator 15.

The field circuit module 50B includes a switching element (not shown) for turning ON/OFF a current supplied to the rotor 10.

The circuit control section outputs control signals of the switching elements of the power circuit modules 50A and the field circuit module 50B, thereby controlling the power circuit modules 50A and the field circuit module 50B.

The housing 3 is formed into a substantially hollow cylindrical shape in which holes for communicating inside and outside are formed at the centers of both ends in the axis direction. The bearings 5 and 6 are coaxially mounted in the housing 3, thereby supporting the rotation shaft 7.

The rotor 10 includes a field winding 11 and a pair of pole core bodies 12. The field winding 11 generates a magnetic flux when supplied with a current. The pair of pole core bodies 12 is provided so as to cover the field winding 11, and forms magnetic poles by the magnetic flux generated in the field winding 11. The pair of pole core bodies 12 is made of, for example, iron. In each pole core body 12, for example, eight claw-shaped magnetic poles are provided on its outer peripheral edge at an equiangular pitch in the circumferential direction so as to protrude in the axis direction. The pole core bodies 12 are fixed to the rotation shaft 7 so that the claw-shaped magnetic poles are opposed and fitted to each other.

The stator 15 includes a stator core 16, and an armature winding 17 wound around the stator core 16. The armature winding 17 is formed of a Y-connected three-phase AC winding.

The heat sink 30 includes a flat ring-shaped base plate 31, and a plurality of cooling fins 32 extended from the rear surface of the base plate 31. The length of a cooling fin 32 extended from a partial range of the base plate 31 in the circumferential direction is smaller than the length of the other cooling fins 32. The heat sink 30 is fixed in the housing 3 in the state where the cooling fins 32 face a fan 18a provided on one side of the rotor 10 in the axis direction and where the shaft center of the base plate 31 is aligned with the shaft center of the rotation shaft 7 so that one side of the rotation shaft 7 is inserted in the heat sink 30. The power circuit modules 50A and the field circuit module 50B are mounted on the front surface of the base plate 31.

The control board 60 is connected to the power circuit modules 50A and the field circuit module 50B via a relay board 65 and a connector 67. Accordingly, the circuit control section of the control board 60 is capable of outputting control signals to the power circuit modules 50A and the field circuit module 50B.

The end of a lead wire 92 of each three-phase AC winding forming the armature winding 17 is electrically connected to the power circuit modules 50A via a relay base 91 and a connection terminal 90.

The brush 24 and the field circuit module 50B are electrically connected to each other via a connection terminal (not shown).

The brush unit 23 includes a box-shaped brush holder 25, the brushes 24, and the springs 26. The brush holder 25 opens at one surface, and has a predetermined depth in a direction orthogonal to the opening surface. The brushes 24 are housed in the brush holder 25 in parallel to each other so that the respective one ends may extend from the opening of the brush holder 25 to extend in the depth direction. The springs 26 serve as urging means for urging the other ends of the brushes 24 in the direction of extending from the brush holder 25.

The brush 24 is manufactured by graphite and copper as main materials.

The spring 26 is provided between the bottom of the brush holder 25 and the brush 24 in a compressed state.

The brush unit 23 is placed by utilizing space set aside by shortening the portion of the cooling fin 32 extended from the base plate 31. In this case, the brush unit 23 is placed by fixing the brush holder 25 to the housing 3 so that the opening portion of the brush holder 25 faces the slip ring 21 and that the ends of the brushes 24 extended from the opening portion of the brush holder 25 are brought into contact with the slip ring 21. Accordingly, the brush 24 is urged to the slip ring 21 due to the urging force of the spring 26, and one end of the brush 24 abuts the slip ring 21 under pressure.

A ventilator 3a is formed in a predetermined region of the outer circumference of the housing 3, which is positioned substantially outside the heat sink 30, the brush unit 23, and one fan 18a. The ventilator 3a has a suction portion on the side apart from the fan 18a and an exhaust portion on the side close to the fan 18a. Air sucked from the suction portion passes through the cooling fin 31 while taking heat from the heat sink 30, and is thereafter guided to the center side of the fan 18a. Then, the air is guided to the outer circumference of the fan 18a along the surface of the fan 18a, and exhausted from the exhaust portion.

The control unit 40 is provided with a connector 79 for communicating to/from an external controller (not shown). The external controller has the function of transmitting control commands to the power circuit modules 50A and the field circuit module 50B. A connector (not shown) is provided to the end of a signal output cable of the external controller, and the connector is fitted into the connector 79, thus enabling sending and receiving of a signal between the external controller and the control board 60.

Next, the system configuration of the generator-motor 1A is described with reference to the drawings.

Figure 3:
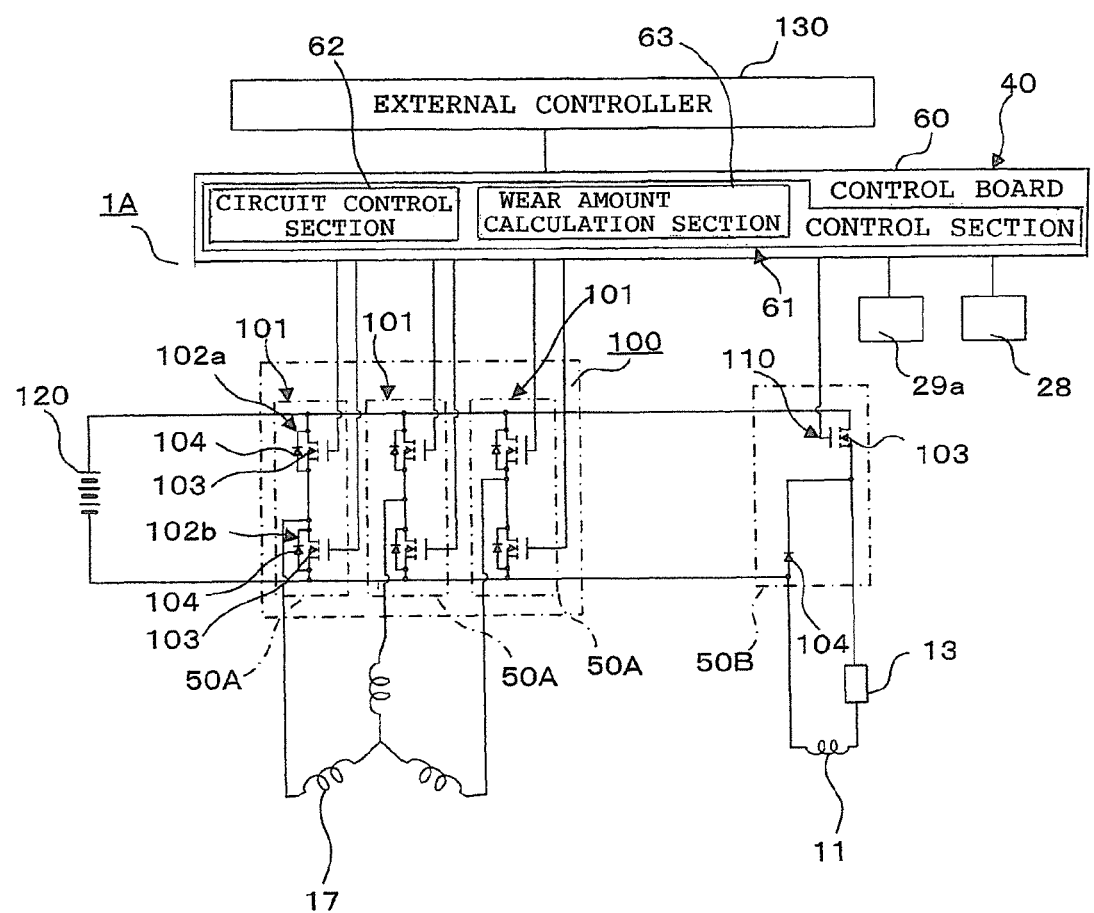
FIG. 3 A system configuration diagram of the generator-motor according to the first embodiment of the present invention.

FIG. 3 is a system configuration diagram of the generator-motor according to the first embodiment of the present invention.

In FIG. 3, the system of the generator-motor 1A includes the armature winding 17 formed of a Y-connected three-phase AC winding, the field winding 11, and a control section 61 incorporated into the control board 60. The control section 61 includes a circuit control section 62 for outputting control signals for controlling currents of the armature winding 17 and the field winding 11, and a wear amount calculation section 63 for calculating a wear amount of the brush 24.

The system of the generator-motor 1A further includes an inverter unit 100, a field circuit section 110, and a battery 120. The inverter unit 100 is connected to the armature winding 17. The inverter unit 100 supplies electric power to the armature winding 17 in accordance with the control signal output from the circuit control section 62, and rectifies an output current of the armature winding 17. The field circuit section 110 supplies electric power to the field winding 11 in accordance with the control signal from the circuit control section 62. The battery 120 is charged by the electric power supplied from the armature winding 17 via the inverter unit 100.

The system of the generator-motor 1A further includes a current detection element 13 for detecting a current flowing through the brush (not shown), in other words, a current flowing through the field winding 11.

The inverter unit 100 is formed by connecting three power circuit sections 101 in parallel, each including a switching element 103 and a diode 104 constituting the power circuit module 50A.

Each power circuit section 101 is formed of an upper arm 102a and a lower arm 102b.

Each of the upper arm 102a and the lower arm 102b is formed by connecting the switching element 103 and the diode 104 constituting the power circuit module 50A in parallel.

The upper arm 102a and the lower arm 102b are connected so that the switching elements 103 are connected in series. In this case, the upper arm 102a is connected on the high potential side of the battery 120, and the lower arm 102b is connected on the low potential side of the battery 120.

A connection portion (intermediate potential terminal) between the upper arm 102a and the lower arm 102b of each power circuit section 101 is connected to the coil end of each phase winding of the armature winding 17 via wiring. A terminal of the switching element 103 for controlling ON/OFF of switching is electrically connected to the circuit control section 62.

The field circuit section 110 is formed by connecting a switching element 103 and a diode 104 constituting the field circuit module 50B in series. The switching element 103 is connected on the high potential side of the battery 120, and the diode 104 is connected on the low potential side of the battery 120. The current detection element 13 and the field winding 11 connected in series are connected to the diode 104 in parallel. A terminal of the switching element 103 for controlling ON/OFF of switching is electrically connected to the circuit control section 62.

In accordance with ON/OFF of the switching elements 103 of the power circuit sections 101 and the field circuit section 110, ON/OFF of electric power supply from the stator 15 and the rotor 10 to the battery 120 or from the battery 120 to the stator 15 and the rotor 10 are switched.

In other words, the power circuit section 101 turns ON/OFF the energization between the battery 120 and the armature winding 17 of the stator 15, and the field circuit section 110 turns ON/OFF the energization between the battery 120 and the field winding 11 of the rotor 10.

Although not illustrated in detail, the current detection element 13 is connected to the control section 61, and the wear amount calculation section 63 is capable of recognizing the magnitude of the field current based on the output of the current detection element 13.

The battery 120 has built-in output voltage acquisition means (not shown) for detecting an output voltage (voltage between input and output terminals) thereof, and an output voltage information output terminal of the battery 120 is connected to the control section 61. The wear amount calculation section 63 is capable of recognizing the output voltage of the battery 120.

The thermometer 29a is electrically connected to the wear amount calculation section 63. Information of the thermometer 29a is input to the wear amount calculation section 63. The wear amount calculation section 63 recognizes the output of the thermometer 29a directly as the temperature of the brush 24.

The rotation sensor 28 is electrically connected to the wear amount calculation section 63. Information on the rotation angle of the rotation shaft 7 is input to the wear amount calculation section 63. The wear amount calculation section 63 is capable of calculating the rotational speed of the rotation shaft 7, in other words, the rotational speed of the rotor 10, based on a temporal change of the rotation angle of the rotation shaft 7.

An external controller 130 and the control section 61 are connected to each other so as to be capable of communication.

The generator-motor 1A configured as described above has both the motor function and the generator function.

First, the operation as a motor is described. At the start of the engine (not shown), DC power is supplied from the battery 120 to the inverter unit 100. The circuit control section 62 instructed by the external controller 130 controls ON/OFF of the switching elements 103 of the inverter unit 100, and a DC current input from the battery 120 to the inverter unit 100 is converted into a three-phase AC current and supplied to the armature winding 17.

A rotating magnetic field is generated around the field winding 11 supplied with the current corresponding to the control signal of the circuit control section 62, and the rotor 10 (see FIG. 1) is rotated. Torque of the rotor 10 is transmitted to the engine from the pulley 8 (see FIG. 1) via a belt (not shown), and the engine is started.

Next, the operation as a generator is described.

In accordance with the command from the external controller 130, the circuit control section 62 controls switching of the switching element 103 constituting the field circuit section 110 so that a field current corresponding to the output of the battery 120 may flow.

When the engine is started, torque of the engine is transmitted to the rotation shaft 7 via a crank shaft, a belt, and the pulley 8 (all not shown). Accordingly, the rotor 10 is rotated to induce a three-phase AC voltage in the armature winding 17.

The circuit control section 62 reads an interphase voltage, and, for example, when the interphase voltage has exceeded a rated voltage of the battery 120, the circuit control section 62 controls the switching element 103 of the power circuit section 101 so that the switching element 103 is switched to OFF.

In this way, the three-phase AC power induced in the armature winding 17 is converted (rectified) to DC power, and the battery 120 is charged by the DC power.

As described above, in the generator-motor 1A, it is necessary to cause the field current to flow to excite the rotor 10 during operation, and hence the battery 120 always supplies the field current to the field winding 11 via the brush 24 and the slip ring 21. Therefore, the temperature of the brush 24 becomes high due to the field current. In this case, as the temperature of the brush 24 becomes higher, particles of graphite and copper constituting the brush 24 are liable to peel off, and hence the release amount of particles of graphite and copper on the surface of the brush 24 held in contact with the slip ring 21 becomes larger.

The generator-motor 1A calculates the wear amount of the brush 24 based on the temperature of the brush 24 and the rotational speed of the rotor 10.

In this case, a wear amount per unit sliding distance of the brush 24 with respect to the slip ring 21 fluctuates depending on the temperature of the brush 24, which is already known.

A function (wear amount function) $f(\theta)$ representing the wear amount per unit sliding distance of the brush 24 with respect to the slip ring (unit sliding wear amount) is defined as a function of the temperature $\theta$ of the brush 24 and stored in the wear amount calculation section 63.

When the diameter of the slip ring 21 is represented by D, and the rotational speed (r/min) at time t is represented by N(t), a total sliding distance L of the brush 24 with respect to the slip ring 21 is represented by Expression 1 below.

$$L = \Sigma \Pi D N(t) \quad \text{[Math. 1]}$$

Expression 1 corresponds to a value obtained by integrating $\Pi D N(t)$ with respect to the time t from 0 to the current time.

When the temperature of the brush 24 at each time is represented by $\theta(t)$, a total wear amount F of the brush 24 is represented by Expression 2 below.

$$F = \Sigma f(\theta(t)) \Pi D N(t) \quad \text{[Math. 2]}$$

As described above, the total wear amount F of the brush 24 is calculated by integrating the product of a value determined in accordance with the temperature of the brush 24 as the wear amount function and a value including the rotational speed of the rotor 10 measured when the temperature of the brush 24 is identified, with respect to the time t from immediately after the start of use of the brush 24 to the current time.

The wear amount calculation section 63 calculates the total wear amount F of the brush 24 based on Expression 2.

The wear amount calculation section 63 grasps the temperature of the brush 24 measured in real time, and calculates the total wear amount of the brush 24 by employing the unit sliding wear amount corresponding to the temperature of the brush 24. Therefore, the calculated total wear amount F of the brush 24 appropriately reflects the temperature change of the brush 2, and the total wear amount F calculated by the wear amount calculation section 63 becomes an accurate value having a small error with respect to an actual wear amount of the brush 24.

Next, the operation of calculating the total wear amount F of the brush 24 performed by the wear amount calculation section 63 is described with reference to the drawings.

Figure 4:
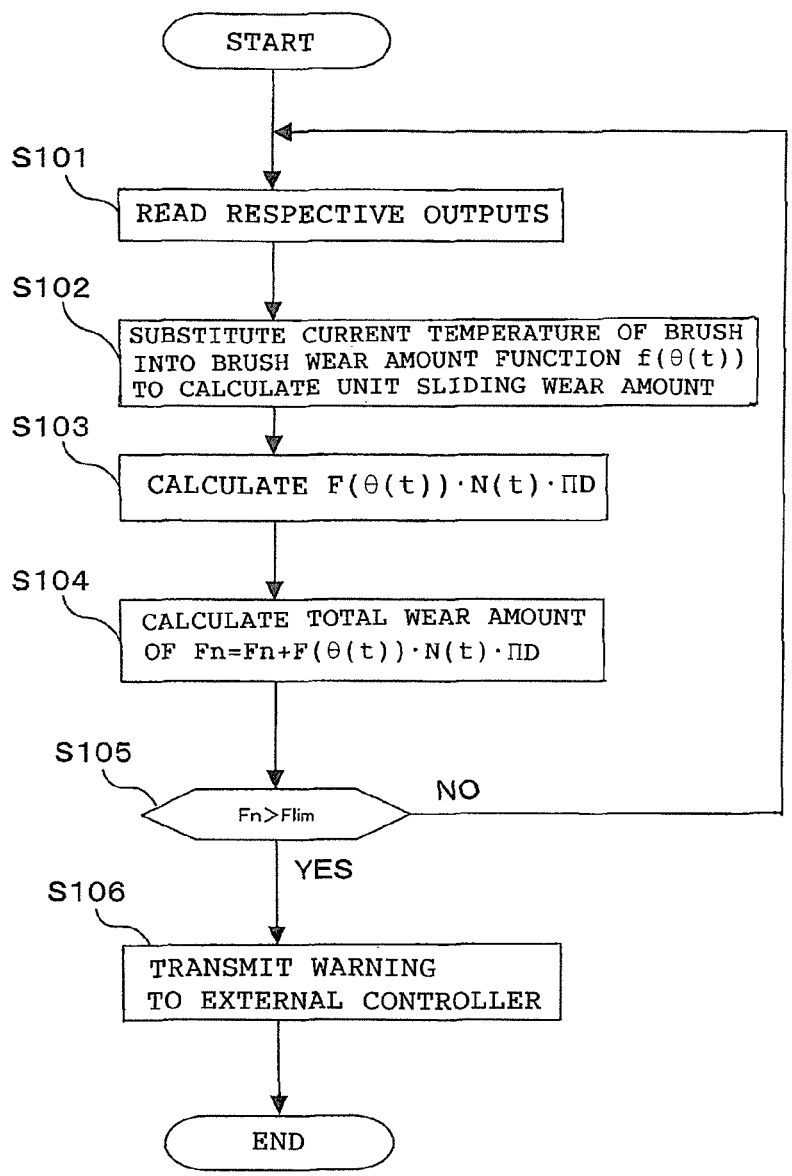
FIG. 4 A flowchart illustrating the calculation of a wear amount of the brush performed by the generator-motor according to the first embodiment of the present invention.

FIG. 4 is a flowchart illustrating the operation of calculating the wear amount of the brush performed by the wear amount calculation section of the generator-motor according to the first embodiment of the present invention.

For the sake of description, FIG. 4 illustrates Step 101 to Step 106 as S101 to S106.

As an initial state, a new generator-motor 1A is prepared. In other words, the brush 24 of the brush 24 unit has not worn yet, and a storage area of the wear amount calculation section 63 stores an initial value of a total wear amount Fn as 0.

In Step 101 of FIG. 4, the wear amount calculation section 63 reads various kinds of received outputs, such as the output of the thermometer 29a and the output of the rotation sensor 28.

In Step 102, the wear amount calculation section 63 inputs an output value of the thermometer 29a to the wear amount function $f(\theta(t))$, and calculates a value of the wear amount function (unit sliding wear amount) which corresponds to the output of the thermometer 29a, in other words, which is determined in accordance with the current temperature of the brush 24.

Further, in Step 103, the wear amount calculation section 63 calculates "the wear amount f(θ(t)) of the brush 24 per unit time×ΠDN(t)" based on the unit sliding wear amount f(θ(t)) and the current rotational speed N(t) (r/min) of the rotation shaft 7.

In addition, in Step 104, the wear amount calculation section 63 sets the result of adding the calculated wear amount of the brush 24 per unit time to the current value of Fn as new Fn. In other words, Fn=Fn+f(θ(t))×ΠDN(t) is calculated. Note that, this calculation is constantly performed for each lapse of a unit time.

Next, in Step 105, the wear amount calculation section 63 determines whether or not the value of Fn has become larger than a limit wear amount Flim of the brush 24.

Note that, the limit wear amount Flim of the brush 24 does not mean an amount at which the function of the brush 24 is lost, but is set as a standard value indicating the arrival of replacement timing of the brush 24.

In Step 105, when the wear amount calculation section 63 determines that Fn has not become larger than Flim, the processing returns to Step 102, and when the wear amount calculation section 63 determines that Fn has become larger than Flim, a warning is issued to the external controller 130 (Step 106).

Although not illustrated in detail, the product such as a vehicle equipped with the generator-motor 1A is provided with notification means for notifying that the wear of the brush 24 has reached a wear limit. When receiving a warning of Fn>Flim, the external controller 130 controls the notification means to notify a warning that the brush 24 has reached a wear limit.

According to the generator-motor 1A in the first embodiment, the wear amount calculation section 63 calculates the total wear amount of the brush 24 by integrating the product of the value determined in accordance with the temperature of the brush 24, the value being the wear amount function defined as the wear amount per unit sliding distance of the brush, and the value including the rotational speed of the rotor 10, with respect to the time from immediately after the start of use of the brush 24 to the current time.

Therefore, according to the generator-motor 1A, the wear of the brush 24 can be calculated in real time during the operation of the system, and further the temperature change of the brush 24 can be accurately reflected in the calculation of the wear amount of the brush 24. Thus, the total wear amount of the brush 24 can be accurately calculated, and a warning that the total wear amount of the brush 24 has reached a limit wear amount can be issued at an appropriate timing. In other words, the generator-motor can be avoided from being damaged unnecessarily.

Second Embodiment

A generator-motor according to a second embodiment of the present invention has the same configuration as in the first embodiment.

Description is given of the operation of calculating a total wear amount of the brush 24 performed by the wear amount calculation section 63.

The wear amount calculation section 63 calculates the total wear amount of the brush 24 in consideration of a field current If(t) in addition to a temperature τ(t) measured by the thermometer 29a and the rotational speed N(t).

In this case, the thermometer 29a measures a temperature of a part of the brush 24 which is apart from the sliding surface of the brush 24 with respect to the slip ring 21. Therefore, the temperature measured by the thermometer 29a cannot follow the actual temperature of the sliding surface of the brush 24 subjected to wear, and a temperature difference occurs between the actual temperature of the sliding surface of the brush 24 subjected to wear and the temperature measured by the thermometer 29a.

It is possible to correct and reduce the temperature difference between the temperature measured by the thermometer 29a and the actual temperature of the sliding surface of the brush 24 based on the magnitude of the field current. Thus, the temperature of the sliding surface of the brush 24 can be estimated more accurately as compared with the case where the temperature is measured only by the thermometer 29a.

The wear amount calculation section 63 calculates a temperature θ(t) of the sliding surface of the brush 24 at time t, based on the temperature τ(t) measured by the thermometer 29a and the field current If (t). In other words, the wear amount function f(θ(t)) is defined as a function of the temperature τ(t) measured by the thermometer 29a and the field current If(t), and a total wear amount F of the brush 24 is calculated based on Expression 3 below. In this way, the total wear amount of the brush 24 can be calculated more accurately.

$$F=\Sigma f(\theta(\tau(t),I\!f(t)))\Pi DN(t) \qquad \text{[Math. 3]}$$

This corresponds to the calculation of the total wear amount of the brush 24 by integrating the product of a value of the wear amount function corresponding to the output of the thermometer 29a and the output of the rotation sensor 28 and a value including the rotational speed of the rotor 10, with respect to time from the start of operation of the brush to the current time.

According to the second embodiment, the wear amount calculation section 63 corrects and reduces the temperature difference between the temperature τ measured by the thermometer 29a and the actual temperature of the sliding surface of the brush 24 in consideration also of the magnitude of the field current If. Thus, in the generator-motor of the second embodiment, the total wear amount of the brush 24 can be estimated more accurately as compared with the case where the temperature of the thermometer 29a is regarded as the temperature of the sliding surface of the brush 24. Therefore, according to the generator-motor in the second embodiment, a warning that the total wear amount of the brush 24 has reached a limit wear amount can be issued at a more appropriate timing, thus avoiding an unnecessary damage on the generator-motor.

Note that, in the above description, the total wear amount of the brush 24 is calculated with the use of the field current If directly detected by the current detection element 13 serving as the current information acquisition means, but the field current If is not always required to be detected by the current detection element 13. The wear amount calculation section 63 may calculate the field current. In other words, the wear amount calculation section 63 may serve also as the current information acquisition means.

The wear amount calculation section 63 obtains the voltage applied to the brush 24 based on the output voltage of the battery 120 and a duty cycle of the field circuit section 110 to be described below. The circuit control section 62 periodically turns ON/OFF the switching element 103 included in the field circuit section 110, thereby controlling the field current to a predetermined current. The duty cycle of the field circuit section 110 is defined as the ratio of the ON-duration of the switching element 103 to the ON/OFF period of the switching element 103.

In this way, the voltage applied to the brush 24 can be calculated based on the output voltage of the battery 120 and the duty cycle of the field circuit section 110.

The resistance value of the brush 24 can be calculated based on the length and temperature of the brush 24. The length of the brush 24 can be calculated based on the past total wear amount of the brush 2, and hence the wear amount calculation section 63 can calculate the field current by calculating the resistance value of the brush 24.

Similarly to the foregoing, the wear amount calculation section 63 calculates the total wear amount of the brush 24 based on the unit sliding wear amount obtained by substituting the field current derived as described above into a field current value as a variable of the wear amount function f. Thus, the total wear amount of the brush 24 can be accurately estimated.

Third Embodiment

Figure 5:
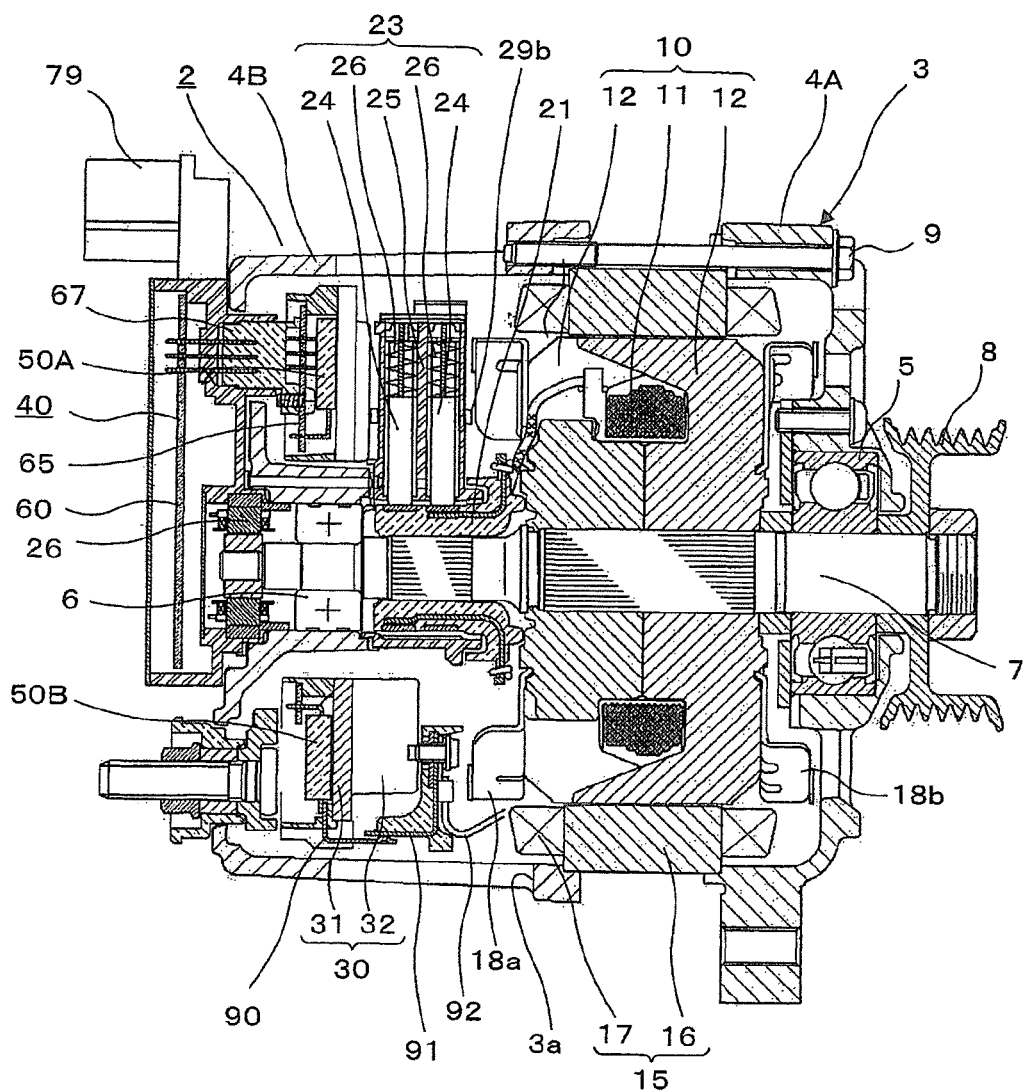
FIG. 5 A cross-sectional view of a generator-motor according to a third embodiment of the present invention.

FIG. 5 is a cross-sectional view of a generator-motor according to a third embodiment of the present invention.

Note that, in FIG. 5, the same parts as the first embodiment are denoted by the same reference symbols, and description thereof is omitted.

In FIG. 5, a generator-motor 1B has the same configuration as in the generator-motor 1A except that the thermometer 29a is omitted and a thermometer 29b is mounted on the outer surface of the brush holder 25.

First, the wear amount of the brush 24 has a deep relation to the temperature of the brush 24 as described above. The correlation between the temperature measured by the thermometer 29b mounted to the brush holder 25 and the actual temperature of the sliding surface of the brush 24 can be estimated as long as the field current and the rotational speed of the rotor 10 are stable, because the structure of the generator-motor 1B is already known. On the other hand, the thermometer 29b is placed at a position different from the brush 24, and hence the temperature measured by the thermometer 29b cannot follow the actual temperature of the sliding surface of the brush 24. Thus, a temperature difference occurs between the actual temperature of the sliding surface of the brush 24 subjected to wear and the temperature measured by the thermometer 29b.

In view of the foregoing, the operation of calculating the wear amount of the brush 24 performed by the wear amount calculation section 63 is described.

Taking into consideration not only the correlation between the temperature measured by the thermometer 29b and the actual temperature of the sliding surface of the brush 24 but also the field current and the rotational speed, the temperature of the brush 24 can be estimated in real time.

When the temperature measured by the thermometer 29b is represented by $\tau(t)$, and the field current is represented by $If(t)$, the temperature $\theta$ of the brush 24 can be represented by $\theta(\tau(t)$, field current $If(t)$, $N(t))$ using the temperature $\tau$, the field current $If$, and the rotational speed $N$ as functions. In other words, the wear amount function $(\theta(t))$ becomes a function using the temperature $\tau(t)$, the field current $If(t)$, and the rotational speed $N(t)$ as variables.

Note that, the temperature $\theta$ of the brush 24 is incorporated with a coefficient for compensating for the correlation between the temperature measured by the thermometer 29b and the temperature of the sliding surface of the brush 24.

The wear amount calculation section 63 calculates the temperature $\theta(t)$ of the brush 24 which is predicted in real time based on information of the sequentially input temperature $\tau(t)$, field current $If(t)$, and rotational speed $N(t)$, and is capable of calculating the total wear amount F of the brush 24 based on the wear amount function $f(\theta(t))$ corresponding to the temperature $\theta(t)$ of the brush 24 and the rotational speed $N(t)$ and based on Expression 4 below.

$$F = \Sigma f(\theta(\tau(t)), If(t), N(t)) \Pi DN(t) \qquad \text{[Math. 4]}$$

Similarly to the above description with reference to the flowchart of FIG. 4, the wear amount calculation section 63 obtains the total wear amount Fn of the brush 24, determines whether or not the total wear amount of the brush 24 has reached a limit wear amount, and determines whether to issue a warning based on the result of determination.

Therefore, the wear amount calculation section 63 compares the obtained total wear amount Fn of the brush 24 to the limit wear amount Flim, and, when determining that Fn has become larger than Flim, the wear amount calculation section 63 issues a warning to the external controller 130.

According to the third embodiment, the temperature of the brush 24 is estimated based on the temperature measured by the thermometer 29b provided in a predetermined region of the generator-motor 1B outside the brush 24, the field current, and the rotational speed of the rotor 10, and the total wear amount of the brush 24 is calculated by integrating the product of the wear amount function defining the wear amount per unit sliding distance of the brush 24 corresponding to the estimated temperature of the brush 24 and the value including the rotational speed of the rotor with respect to the time from the start of operation of the brush 24 to the current time.

The wear amount calculation section 63 calculates the wear amount of the brush 24 by precisely reflecting the temperature of the brush 24 predicted based on the output of the thermometer 29b, the field current, and the rotational speed of the rotor 10. Thus, the wear amount of the brush 24 can be accurately calculated. In this way, a warning that the wear amount of the brush 24 has reached a limit wear amount can be issued at an appropriate timing.

As in the generator-motor 1A, in the case where the temperature of the brush 24 is measured directly by the thermometer 29a, it is necessary to bury the thermometer 29b in the brush 24. The field current always flows through the brush 24 during the operation of the generator-motor 1A, and hence the temperature of the brush 24 becomes very high. It is necessary to use the thermometer 29a having a very high temperature measurement range, and hence an expensive thermometer needs to be used. Further, the thermometer 29a is mounted inside the brush 24, which imposes large dimensional restrictions and complicates the manufacturing step for incorporating the thermometer into the brush 24.

In the generator-motor 1B, on the other hand, the thermometer 29b is provided on the brush holder 25 outside the brush 24, and hence a measurement temperature required for the thermometer 29b is reduced as compared with the case where the thermometer is mounted directly on the brush 24. Thus, an inexpensive thermometer 29b is sufficient, and the manufacturing cost can be reduced.

Further, the thermometer 29b is mounted on the brush holder 25, and hence the temperature measured by the thermometer 29b follows the temperature change of the brush 29b without a large delay. Thus, the temperature of the brush 24 can be obtained based on the output of the thermometer 29b with a smaller error.

Note that, in the description of the third embodiment, the thermometer 29b is provided on the outer surface of the brush holder 25, but the same effects can be obtained even when the thermometer 29*b* is mounted in a predetermined region of any of the components of the generator-motor 1B other than the brush 24.

For example, the thermometer may be mounted on a component which is vulnerable to heat and needs thermal protection. In this case, temperature measurement used for heating protection of the component and temperature measurement used for estimating the wear amount of the brush 24 can be performed by a single thermometer. Thus, the overall cost of the generator-motor 1B can be reduced.

The thermometer 29*b* may be mounted on the housing 3 so as to be capable of detecting the temperature of air sucked from the suction portion of the ventilator 3*a*. The temperature of the sucked air often has a close relation to the temperature of each component of the generator-motor. The thermometer 29*b* can be used not only for calculating the wear amount of the brush 24 but also for protecting overheat of various kinds of components. Therefore, a single thermometer 29*b* can be used for the purpose of providing various functions to the generator-motor, and hence the functionality of the generator-motor can be improved while the cost is suppressed.

Note that, in the description of the third embodiment, the wear amount function is defined as a function having the measured temperature of the thermometer 29*a*, the field current, and the rotational speed of the rotor 10 as variables, but, for example, the wear amount function may be defined as a function having two of the measured temperature of the thermometer 29*a* and the rotational speed of the rotor 10 as variables. In this case, the wear amount calculation section 63 can calculate the total wear amount of the brush 24 by integrating the product of a value of the wear amount function corresponding to the output of the thermometer 29*a* and the output of the rotation sensor 28 and the value including the rotational speed of the rotor 10 with respect to the time from immediately after the start of use of the brush 24 to the current time.

However, when the field current is included in the variable of the wear amount function, the total wear amount of the brush 24 can be calculated more precisely.

Fourth Embodiment

A generator-motor according to a fourth embodiment of the present invention has the same configuration as in the generator-motor 1A.

Next, description is given of the calculation of a wear amount of the brush 24 performed by the wear amount calculation section 63 of the generator-motor.

In this case, the resistance between each brush 24 and the slip ring 21 changes in accordance with the pressure between contact surfaces of the brush 24 and the slip ring 21. As the pressure between the contact surfaces of the brush 24 and the slip ring 21 increases, the resistance between the brush 24 and the slip ring 21 becomes smaller. Thus, as the brush 24 becomes shorter, the spring 26 becomes longer, and the urging force of the spring 26 decreases, with the result that the pressure between the contact surfaces of the brush 24 and the slip ring 21 decreases to increase the resistance between the brush 24 and the slip ring 21.

The wear amount calculation section 63 is configured to calculate the voltage applied to the brush 24 with the use of the output voltage of the battery 120 and the duty cycle of the field circuit, and calculate the resistance value of the brush 24 based on the calculated voltage and the field current detected by the current detection element 13. In the following, the resistance value of the brush 24 calculated by the wear amount calculation section 63 by this method is referred to as an electric charge-converted resistance value.

Further, the wear amount calculation section 63 stores a resistance value of the brush 24 measured at a predetermined temperature at the time of manufacture (before use). The resistance value of the brush 24 fluctuates in accordance with the temperature of the brush 24. Even when the brush 24 has worn, the wear amount calculation section 63 can grasp the length of the worn brush 24 based on the total wear amount of the brush 24, and it is therefore also possible to calculate a resistance value of the current brush 24 placed under a predetermined temperature environment based on the resistance value of the brush 24 measured before the use. In the following, the resistance value calculated based on the total wear amount of the brush 24 and the resistance value of the brush 24 before wear is referred to as a wear amount-converted resistance value.

In order to calculate the wear amount of the brush 24 per unit sliding of the brush 24, the wear amount calculation section reflects a result of comparison between the electric charge-converted resistance value and the wear amount-converted resistance value in the wear amount function, to thereby calculate the total wear amount of the brush 24. Thus, the wear amount per unit sliding of the brush 24 can be calculated more accurately.

Note that, in the same manner as described above with reference to the flowchart of FIG. 4, the wear amount calculation section 63 obtains the total wear amount Fn of the brush 24, determines whether or not the total wear amount of the brush 24 has reached a limit wear amount, and determines whether or not to issue a warning based on the result of determination.

As described above, according to the generator-motor in the fourth embodiment, the wear amount calculation section 63 compares the wear amount-converted resistance value calculated based on information on the past total wear amount and the resistance value of the brush 24 at a predetermined temperature before wear to the electric charge-converted resistance value calculated based on the output voltage of the battery 120 and the duty cycle of the field circuit section 110. Thus, the current temperature of the brush 24 can be precisely estimated.

Therefore, the generator-motor in the fourth embodiment can calculate the total wear amount of the brush 24 more accurately than that in the first embodiment. In this way, a warning that the wear amount of the brush 24 has reached a limit wear amount can be issued at a more appropriate timing, thus avoiding an unnecessary damage on the generator-motor.

Fifth Embodiment

Figure 6:
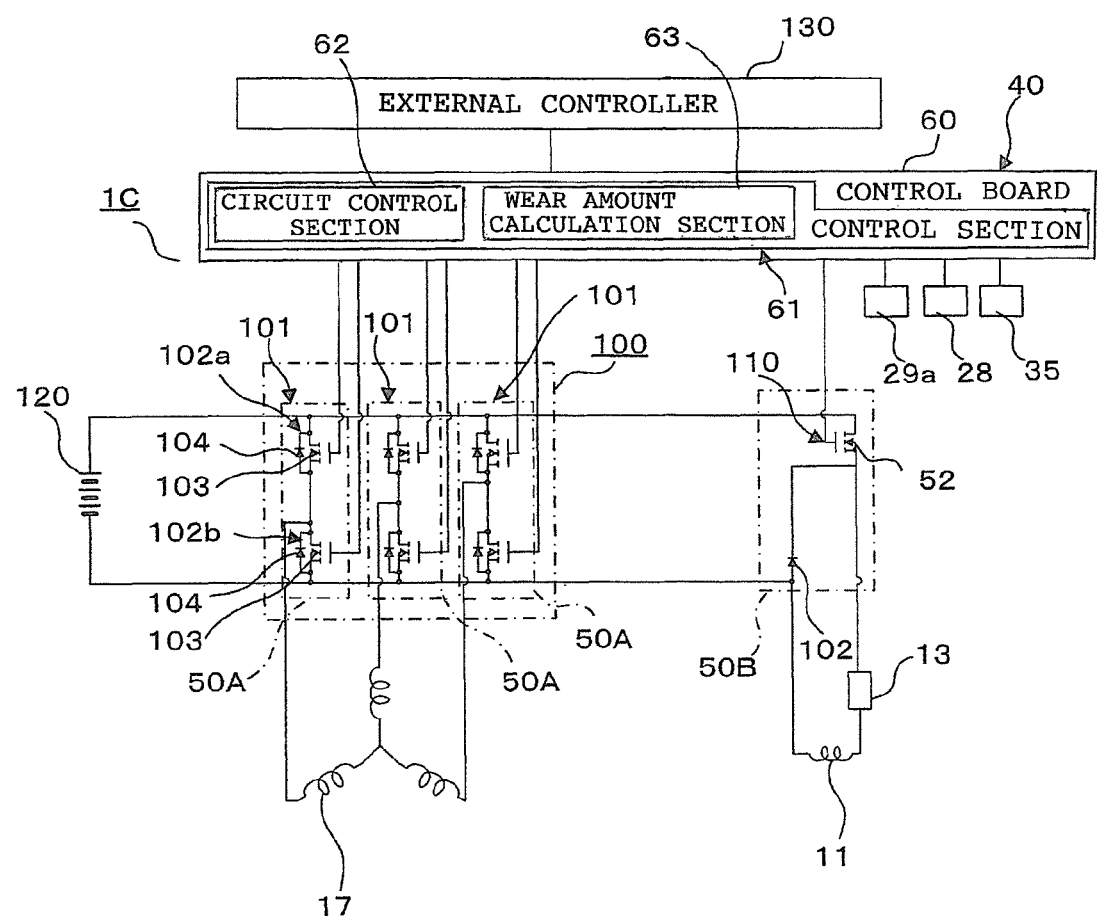
FIG. 6 A system configuration diagram of a generator-motor according to a fifth embodiment of the present invention.

FIG. 6 is a system configuration diagram of the generator-motor according to a fifth embodiment of the present invention.

Note that, in FIG. 6, the same parts as the first embodiment are denoted by the same reference symbols, and description thereof is omitted.

In FIG. 6, a generator-motor 1C includes a pressure sensor 35 serving as urging force detection means for measuring an urging force of the spring 26.

Although not illustrated in detail, the pressure sensor 35 is interposed, for example, between the other end of the spring 26 having one end abutting the brush 24 and the brush holder 25, so as to detect the pressure of the other end of the spring 26 against the brush holder 25.

A force of the other end of the spring 26 for urging the brush holder 25 corresponds to a force of the one end of the spring 26 for urging the brush 24.

The pressure sensor 35 is connected to the wear amount calculation section 63, and the wear amount calculation section 63 can read an output of the pressure sensor 35.

Next, description is given of the calculation of a wear amount of the brush 24 performed by the wear amount calculation section 63 of the generator-motor 1C.

The progress rate of the wear of the brush 24 is larger as the urging force of the spring 26 for pressing the brush 24 against the slip ring 21 becomes larger. As the wear of the brush 24 progresses, the compressed spring 26 becomes extended, and hence the urging force of the spring 26 is reduced to decrease the progress rate of the wear of the brush 24.

In view of this, the wear amount calculation section 63 obtains the total wear amount of the brush 24 by reflecting a urging force P(t) of the spring 26 in the calculation of the wear amount of the brush 24. In other words, the wear amount calculation section 63 calculates the wear amount of the brush 24 by using the wear amount function f as a function of the temperature τ(t) measured by the thermometer 29a and the urging force P(t) of the spring 26.

For example, a coefficient p(t) is defined, which indicates the degree of reduction of the wear rate of the brush 24 in accordance with the reduction in urging force P(t) of the spring 26. In this case, the wear amount function $f(\theta(t), P(t)) = f(\theta(t)) \times p(t)$ can be established.

The total wear amount F of the brush 24 is represented by Expression 5 below.

$$F = \Sigma f(\theta(t), P(t)) \Pi DN(t) \quad \text{[Math. 5]}$$
$$= \Sigma f(\theta(t), p(t)) \Pi DN(t)$$

In other words, the wear amount calculation section 63 calculates the total wear amount of the brush 24 by integrating the product of a value of the wear amount function determined in accordance with information including the output of the pressure sensor 35 and the output of the thermometer 29a and the value including the rotational speed of the rotor 10 with respect to the time from immediately after the start of use of the brush 24 to the current time.

Similarly to the above description with reference to the flowchart of FIG. 4, the wear amount calculation section 63 obtains the total wear amount Fn of the brush 24, determines whether or not the total wear amount of the brush 24 has reached a limit wear amount, and determines whether to issue a warning based on the result of determination.

As described above, the wear amount calculation section 63 calculates the total wear amount F of the brush 24 in consideration not only of the temperature of the brush 24 but also of the urging force of the spring 26, and hence the calculated wear amount of the brush 24 has a small error with respect to the actual wear amount of the brush 24.

Thus, the wear amount calculation section 63 can issue a warning that the wear amount of the brush 24 has reached a limit wear amount at a more appropriate timing, thus avoiding an unnecessary damage on the generator-motor.

Note that, in the above description, the urging force detection means is the pressure sensor 35, but the wear amount calculation section 63 may serve also as the urging force detection means.

In other words, the ROM of the wear amount calculation section 63 stores a spring constant of the spring 26 and a compressed amount of the spring 26 in the initial state.

The urging force of the spring 26 can be calculated based on the spring constant and the compressed amount of the spring 26. The compressed amount of the spring 26 changes in accordance with the total wear amount of the brush 24, but the reduced amount of the length of the brush 24 can be grasped based on the total wear amount of the brush 24, and hence the wear amount calculation section 63 can calculate the compressed amount of the spring 26 in accordance with the total wear amount of the brush 24. In other words, the wear amount calculation section 63 can calculate the urging force of the spring 26 in real time.

As described above, the function of the wear amount calculation section 63 for calculating the urging force P(t) of the spring 26 by calculation is used as the urging force detection means, and hence the same effects as those in the case of calculating the urging force P(t) of the spring 26 by the pressure sensor 35 can be obtained.

Sixth Embodiment

Figure 7:
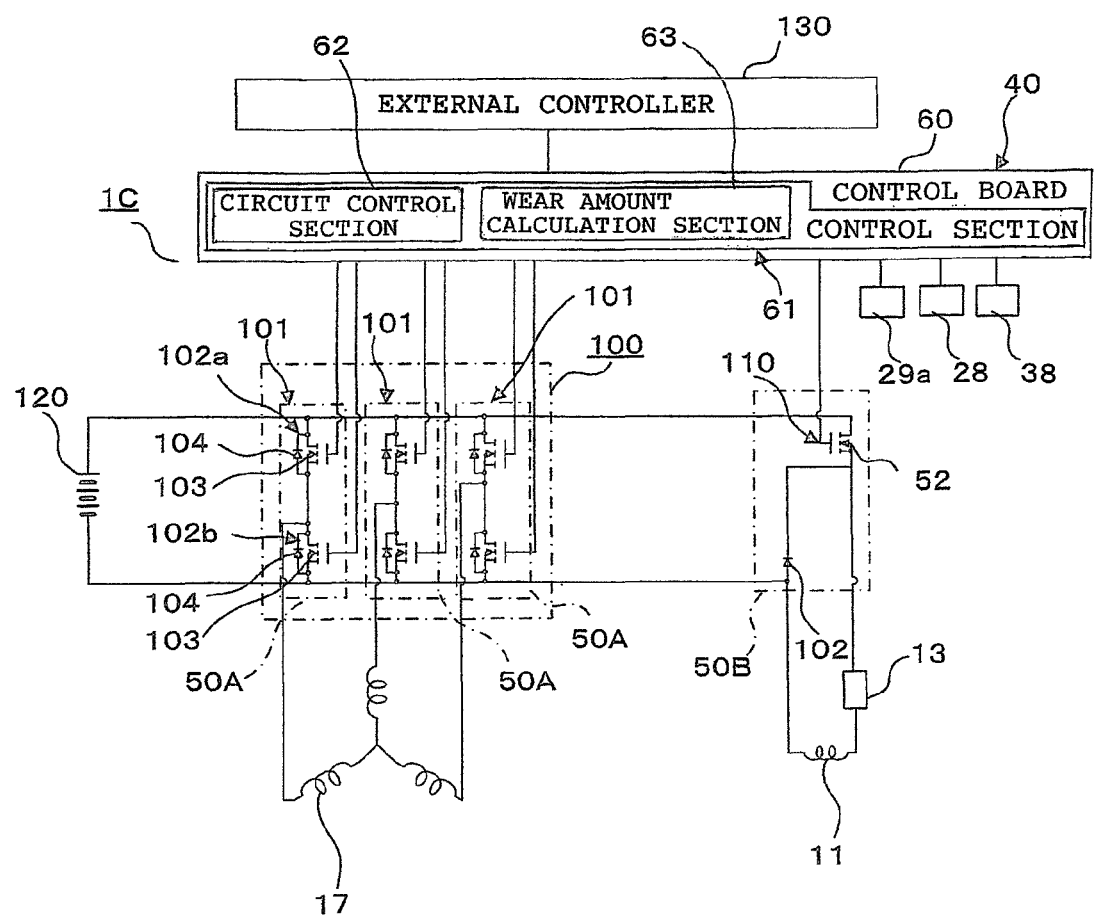
FIG. 7 A system configuration diagram of a generator-motor according to a sixth embodiment of the present invention.

FIG. 7 is a system configuration diagram of a generator-motor according to a sixth embodiment of the present invention.

Note that, in FIG. 7, the same parts as the first embodiment are denoted by the same reference symbols, and description thereof is omitted.

In FIG. 7, a generator-motor 1D includes a hygrometer 38 for measuring humidity of air under the same environment as that of air around the slip ring 21.

The other configurations are the same as those of the generator-motor 1A.

The degree of friction between the brush 24 and the slip ring 21 varies depending on the state of a water film which is formed on the surface of the slip ring and the sliding surface of the brush 24 by moisture in the air.

As the humidity increases, the water film becomes thicker to reduce the friction between the brush 24 and the slip ring 21, and the brush 24 is more likely to slide. As the humidity decreases, the water film becomes thinner to increase the friction between the brush 24 and the slip ring 21, and the brush 24 is less likely to slide.

For example, in the case where the generator-motor is used in Japan having a large humidity change between summer and winter, the wear amount of the brush 24 remarkably differs between summer and winter.

In view of this, the wear amount calculation section 63 obtains the total wear amount of the brush 24 by reflecting a humidity H(t) measured by the hygrometer 38 in the calculation of the wear amount of the brush 24. In other words, the wear amount function f is prepared as a function using the temperature τ(t) output by the thermometer 29a and the humidity H(t) output by the hygrometer 38 as variables.

For example, a coefficient h(t) is defined, which indicates the degree of change of the wear rate of the brush 24 in accordance with the change in humidity. In this case, the wear amount function $f(\theta(t), H(t)) = f(\theta(t)) \times h(t)$ can be established.

The total wear amount F of the brush 24 is represented by Expression 6 below.

$$F = \Sigma f(\theta(t), H(t)) \Pi DN(t) \quad \text{[Math. 6]}$$
$$= \Sigma f(\theta(t), h(t)) \Pi DN(t)$$

In other words, the wear amount calculation section 63 calculates the total wear amount F of the brush 24 by integrating the product of a value of the wear amount function determined in accordance with information including the output of the hygrometer 38 and the output of the thermometer 29a and the value including the rotational speed of the rotor 10 with respect to the time from immediately after the start of use of the brush 24 to the current time.

Similarly to the above description with reference to the flowchart of FIG. 4, the wear amount calculation section 63 obtains the total wear amount Fn of the brush 24, determines whether or not the total wear amount of the brush 24 has reached a limit wear amount, and determines whether to issue a warning based on the result of determination.

As described above, the wear amount calculation section 63 calculates the total wear amount F of the brush 24 in consideration not only of the temperature of the brush 24 but also of the humidity, and hence the calculated total wear amount of the brush 24 has a small error with respect to the actual total wear amount of the brush 24.

Thus, the wear amount calculation section 63 can issue a warning that the wear amount of the brush 24 has reached a limit wear amount at a more appropriate timing, thus avoiding an unnecessary damage on the generator-motor.

In the sixth embodiment, the wear amount function f has the temperature τ measured by the thermometer 29a and the humidity H(t) measured by the hygrometer 38 as variables, but the wear amount function f is not limited thereto. In addition to those variables, it is also possible to use the wear amount function f having the measurement pressure P(t) of the pressure sensor 35 as a variable similarly to the fourth embodiment or a wear amount function having the rotational speed N(t) of the rotor 10 as a variable.

In each of the embodiments, the rotating electrical machine is a generator-motor, but the rotating electrical machine may be a motor or a generator having a similar configuration to that of the generator-motor.

REFERENCE SIGNS LIST 3 housing, 7 rotation shaft, 10 rotor, 11 field winding, 13 current detection element (current information acquisition means), 15 stator, 17 armature winding, 21 slip ring, 24 brush, 25 brush holder, 26 spring (urging means), 28 rotation sensor (rotation information acquisition means), 29a, 29b thermometer, 35 pressure sensor (urging force detection means), 38 hygrometer, 62 circuit control section, 63 wear amount calculation section, 101 power circuit section, 110 field circuit section, 120 battery.

The invention claimed is:

1. A rotating electrical machine, comprising:
a housing;
a rotor including a field winding, the rotor being coaxially fixed to a rotation shaft which is supported by the housing in a rotatable manner;
a stator including an armature winding, the stator being fixed to the housing so as to surround the rotor;
a slip ring fixed to the rotation shaft;
a brush disposed at a position in contact with the slip ring;
urging member for urging the brush against the slip ring;
a temperature detector that acquires information on a temperature of the brush;
a rotation sensor that acquires information on a rotation angle of the rotation shaft; and
a processor storing instructions configured to implement;
a wear amount calculation section for acquiring the temperature of the brush based on temperature information including output information of the temperature detector, and for calculating a total wear amount of the brush by integrating a product of a value corresponding to the temperature of the brush, the value being a wear amount function defined as a wear amount per unit sliding distance of the brush with the temperature of the brush used as a variable, and a value including a rotational speed of the rotor determined based on a temporal change of the rotation angle of the rotation shaft, with respect to time from immediately after start of use of the brush to a current time.

2. A rotating electrical machine according to claim 1, wherein the wear amount function is defined as a function including the rotational speed of the rotor as a variable, and
wherein the wear amount calculation section calculates the total wear amount of the brush by integrating a product of a value of the wear amount function corresponding to an output of the rotation sensor and the value including the rotational speed of the rotor, with respect to the time from immediately after the start of use of the brush to the current time.

3. A rotating electrical machine according to claim 1, further comprising a current detector for acquiring information on a field current flowing through the field winding,
wherein the wear amount function is defined as a function including the field current as a variable, and
wherein the wear amount calculation section calculates the total wear amount of the brush by integrating a product of a value of the wear amount function corresponding to outputs of the temperature detector and the current detector and the value including the rotational speed of the rotor, with respect to the time from immediately after the start of use of the brush to the current time.

4. A rotating electrical machine according to claim 3, further comprising:
a battery;
a field circuit section, implemented by the processor, for turning ON/OFF energization between the battery and the field winding;
a power circuit section, implemented by the processor, for turning ON/OFF energization between the battery and the armature winding; and
a circuit control section, implemented by the processor, for controlling the power circuit section and the field circuit section,
wherein the wear amount calculation section serves also as the current detector, and acquires information on a magnitude of the field current based on an output voltage of the battery and a duty cycle of the field circuit section.

5. A rotating electrical machine according to claim 3, further comprising:
a battery;
a field circuit section, implemented by the processor, for turning ON/OFF energization between the battery and the field winding;
a power circuit section, implemented by the processor, for turning ON/OFF energization between the battery and the armature winding; and
a circuit control section, implemented by the processor, for controlling the power circuit section and the field circuit section, wherein the wear amount calculation section is configured to:
calculate a voltage applied to the brush based on an output voltage of the battery and a duty cycle of the field circuit section, and calculate a resistance value of the brush as an electric charge-converted resistance value based on the calculated output voltage and the field current measured by the current detector; and
calculate a current length of the brush based on the total wear amount of the brush, calculate a current resistance value of the brush as a wear amount-converted resistance value based on information on a resistance value of the brush measured before the brush wears, and reflect a result of comparison between the electric charge-converted resistance value and the wear amount-converted resistance value in a calculation of a wear amount of the brush, thereby calculating the total wear amount of the brush.

6. A rotating electrical machine according to claim 1, further comprising a current detector for acquiring information on a field current flowing through the field winding,
wherein the wear amount function is defined as a function including the field current and the rotational speed of the rotor as variables, and
wherein the wear amount calculation section calculates the total wear amount of the brush by integrating a product of the wear amount function corresponding to outputs of the temperature detector, the current detector, and the rotation sensor and the value including the rotational speed of the rotor, with respect to the time from immediately after the start of use of the brush to the current time.

7. A rotating electrical machine according to claim 6, further comprising:
a battery;
a field circuit section, implemented by the processor, for turning ON/OFF energization between the battery and the field winding;
a power circuit section, implemented by the processor, for turning ON/OFF energization between the battery and the armature winding; and
a circuit control section, implemented by the processor, for controlling the power circuit section and the field circuit section,
wherein the wear amount calculation section serves also as the current detector, and acquires information on a magnitude of the field current based on an output voltage of the battery and a duty cycle of the field circuit section.

8. A rotating electrical machine according to claim 6, further comprising:
a battery;
a field circuit section, implemented by the processor, for turning ON/OFF energization between the battery and the field winding;
a power circuit section, implemented by the processor, for turning ON/OFF energization between the battery and the armature winding; and
a circuit control section, implemented by the processor, for controlling the power circuit section and the field circuit section,
wherein the wear amount calculation section is configured to:
calculate a voltage applied to the brush based on an output voltage of the battery and a duty cycle of the field circuit section, and calculate a resistance value of the brush as an electric charge-converted resistance value based on the calculated output voltage and the field current measured by the current detector; and
calculate a current length of the brush based on the total wear amount of the brush, calculate a current resistance value of the brush as a wear amount-converted resistance value based on information on a resistance value of the brush measured before the brush wears, and reflect a result of comparison between the electric charge-converted resistance value and the wear amount-converted resistance value in a calculation of a wear amount of the brush, thereby calculating the total wear amount of the brush.

9. A rotating electrical machine according to claim 1, wherein the temperature detector measures a temperature of a predetermined part outside the brush.

10. A rotating electrical machine according to claim 9, further comprising a brush holder for supporting the brush,
wherein the temperature detector measures a temperature of the brush holder.

11. A rotating electrical machine according to claim 1, further comprising urging force detector for acquiring an urging force of the urging member,
wherein the wear amount function is defined as a function including the urging force acquired by the urging force detection means as a variable, and
wherein the wear amount calculation section calculates the total wear amount of the brush by integrating a product of a value of the wear amount function corresponding to information including an output of the urging force detector and the value including the rotational speed of the rotor, with respect to the time from immediately after the start of use of the brush to the current time.

12. A rotating electrical machine according to claim 1, further comprising a hygrometer for measuring a humidity of air around the slip ring,
wherein the wear amount function is defined as a function including the humidity of the air under the same environment as the environment of the air around the slip ring as a variable, and
wherein the wear amount calculation section calculates the total wear amount of the brush by integrating a product of a value of the wear amount function corresponding to information including output information of the hygrometer and the value including the rotational speed of the rotor, with respect to the time from immediately after the start of use of the brush to the current time.

* * * * *